US012016808B2

(12) United States Patent
Cutler et al.

(10) Patent No.: US 12,016,808 B2
(45) **Date of Patent: *Jun. 25, 2024**

(54) PATIENT SUPPORT APPARATUS HAVING PATIENT SUPPORT DECK AND GAP COVERING DECK SECTION

(71) Applicant: Stryker Corporation, Kalamazoo, MI (US)

(72) Inventors: Matthew A. Cutler, Portage, MI (US); David Scharich, III, Coloma, MI (US); Zachary J. Sadler, South Lyon, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,856

(22) Filed: Dec. 19, 2022

(65) Prior Publication Data

US 2023/0122204 A1 Apr. 20, 2023

Related U.S. Application Data

(63) Continuation of application No. 16/596,198, filed on Oct. 8, 2019, now Pat. No. 11,554,062.

(60) Provisional application No. 62/742,664, filed on Oct. 8, 2018.

(51) Int. Cl.
*A61G 7/015* (2006.01)

(52) U.S. Cl.
CPC .................................. *A61G 7/015* (2013.01)

(58) Field of Classification Search
CPC ................................ A61G 7/015; A61G 7/018
See application file for complete search history.

(56) References Cited

U.S. PATENT DOCUMENTS

| | | | | |
|---|---|---|---|---|
| 5,469,591 | A | 11/1995 | Nomura | |
| 7,610,638 | B2 | 11/2009 | Kramer et al. | |
| 8,806,682 | B2 | 8/2014 | Hornbach et al. | |
| 9,635,949 | B2 | 5/2017 | Nomura et al. | |
| 9,814,323 | B2 | 11/2017 | Nomura et al. | |
| 9,907,714 | B2 | 3/2018 | Malvestio | |
| 11,554,062 | B2 * | 1/2023 | Cutler .................... | A61G 7/018 |
| 2002/0174487 | A1 | 11/2002 | Kramer et al. | |
| 2002/0178502 | A1 | 12/2002 | Beasley et al. | |
| 2005/0039263 | A1 | 2/2005 | Reed et al. | |
| 2010/0212087 | A1 | 8/2010 | Leib et al. | |
| 2011/0232001 | A1 | 9/2011 | Poulos et al. | |

(Continued)

*Primary Examiner* — Eric J Kurilla
(74) *Attorney, Agent, or Firm* — Howard & Howard Attorneys PLLC

(57) ABSTRACT

A patient support apparatus includes a support frame and a patient support deck operatively attached to the support frame. The patient support deck includes an adjacent pair of deck sections with a first one of the deck sections moveable between an initial configuration and a raised configuration. A gap covering deck section is slidingly engaged to a top surface of the first or second one of the adjacent deck sections and is pivotably coupled to either the other one of the deck sections or to the support frame, with the gap covering deck section configured to slide along the top surface in response to the movement of the first one of the deck sections so as to be at least partially disposed over a gap between the adjacent deck sections when the first one of the deck sections is in the raised configuration.

17 Claims, 13 Drawing Sheets

(56) References Cited

U.S. PATENT DOCUMENTS

| | | | |
|---|---|---|---|
| 2012/0124745 | A1 | 5/2012 | Heimbrock et al. |
| 2015/0182400 | A1 | 7/2015 | Meyer et al. |
| 2016/0037936 | A1 | 2/2016 | Nomura et al. |
| 2016/0227929 | A1 | 8/2016 | Paul et al. |
| 2016/0302985 | A1 | 10/2016 | Tessmer et al. |
| 2017/0367913 | A1 | 12/2017 | Cox et al. |
| 2019/0191880 | A1 | 6/2019 | Sweeney |
| 2020/0107980 | A1 | 4/2020 | Cutler et al. |

* cited by examiner

FIG. 13A
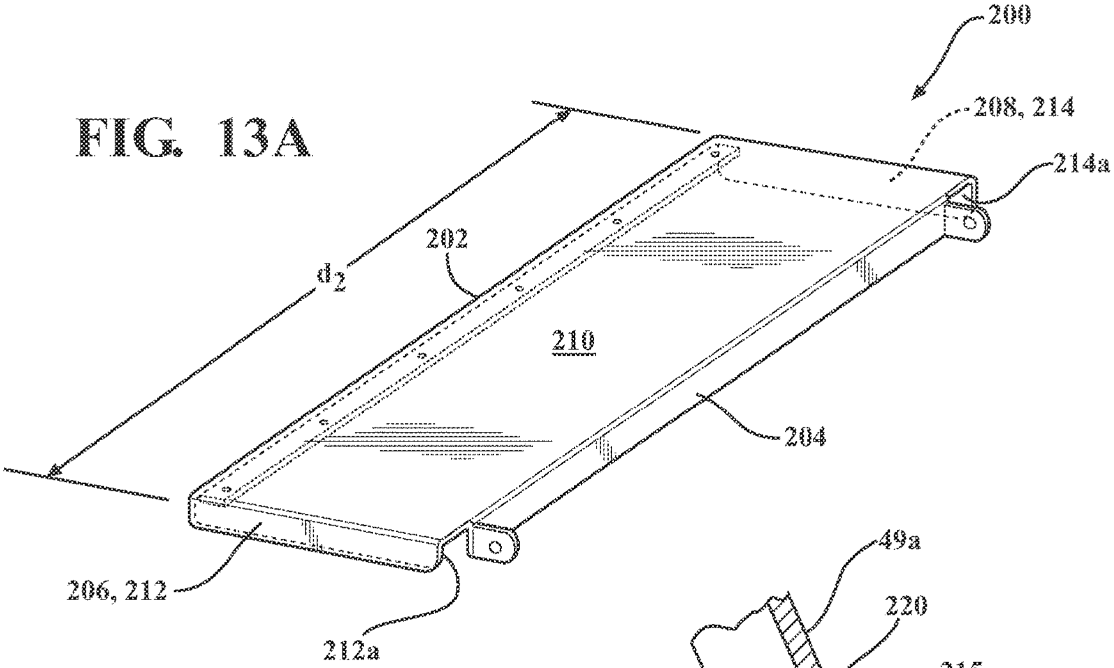
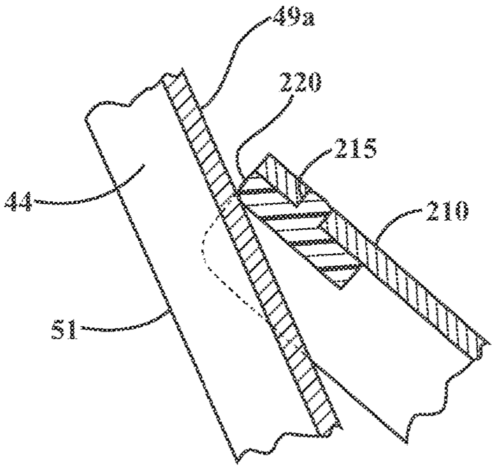
FIG. 13C
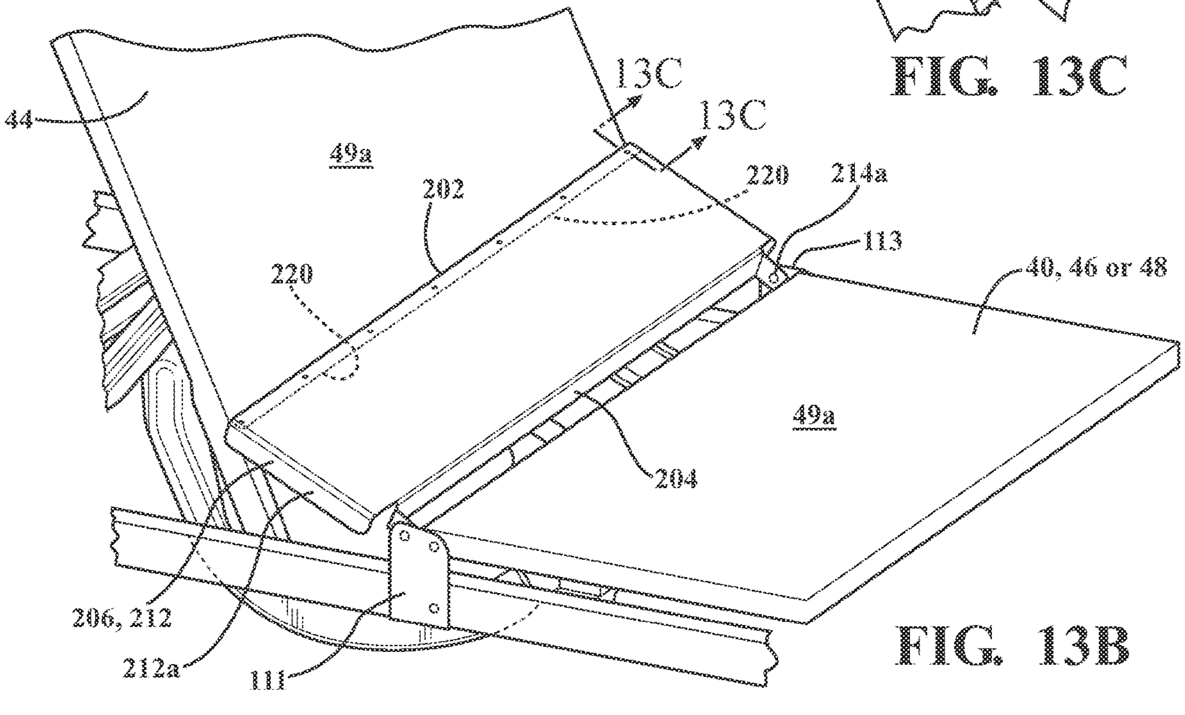
FIG. 13B

PATIENT SUPPORT APPARATUS HAVING PATIENT SUPPORT DECK AND GAP COVERING DECK SECTION

CROSS-REFERENCE TO RELATED APPLICATIONS

This application is a Continuation of U.S. patent application Ser. No. 16/596,198 filed on Oct. 8, 2019, which claims priority to and the benefit of U.S. Provisional Patent Application No. 62/742,664 filed on Oct. 8, 2018, the disclosures of each of which are hereby incorporated by reference in their entirety.

BACKGROUND

Patient support apparatuses, such as hospital beds, stretchers, cots, tables, wheelchairs, and chairs facilitate care of patients in a health care setting. Conventional patient support apparatuses comprise a base, a support frame upon which the patient is supported, a patient support deck operatively attached to the support frame, and actuators arranged to move sections of the patient support deck relative to the support frame. A mattress is typically included on the patient support deck.

It is sometimes desirable for the actuators to move, such as by articulation, one or more of the sections of the patient support deck to a predetermined maximum raised configuration to promote enhanced patient comfort. However, when one of the sections is moved relative to the next adjacent section, or when both sections are simultaneously moved, a gap between such adjacent sections may increase proportional to the relative amount of articulation. As the gap increases, the area beneath the mattress associated with this increasing gap is unsupported, which may result in the mattress and patient sagging into the gap.

A patient support apparatus designed to overcome one or more of the aforementioned challenges is desired.

BRIEF DESCRIPTION OF THE DRAWINGS

FIG. 13A is a perspective view of the gap covering deck section including a wear resistant material according to the embodiments of FIGS. 1-12.

FIG. 13B is a perspective view of the gap covering deck section of FIG. 13A in which the wear resistant material is slidingly engaged to a top surface of one of the adjacent deck sections in accordance with one embodiment.

FIG. 13C is a cross-sectional view of FIG. 13B taken along line 13C-13C.

DETAILED DESCRIPTION

Figure 1:
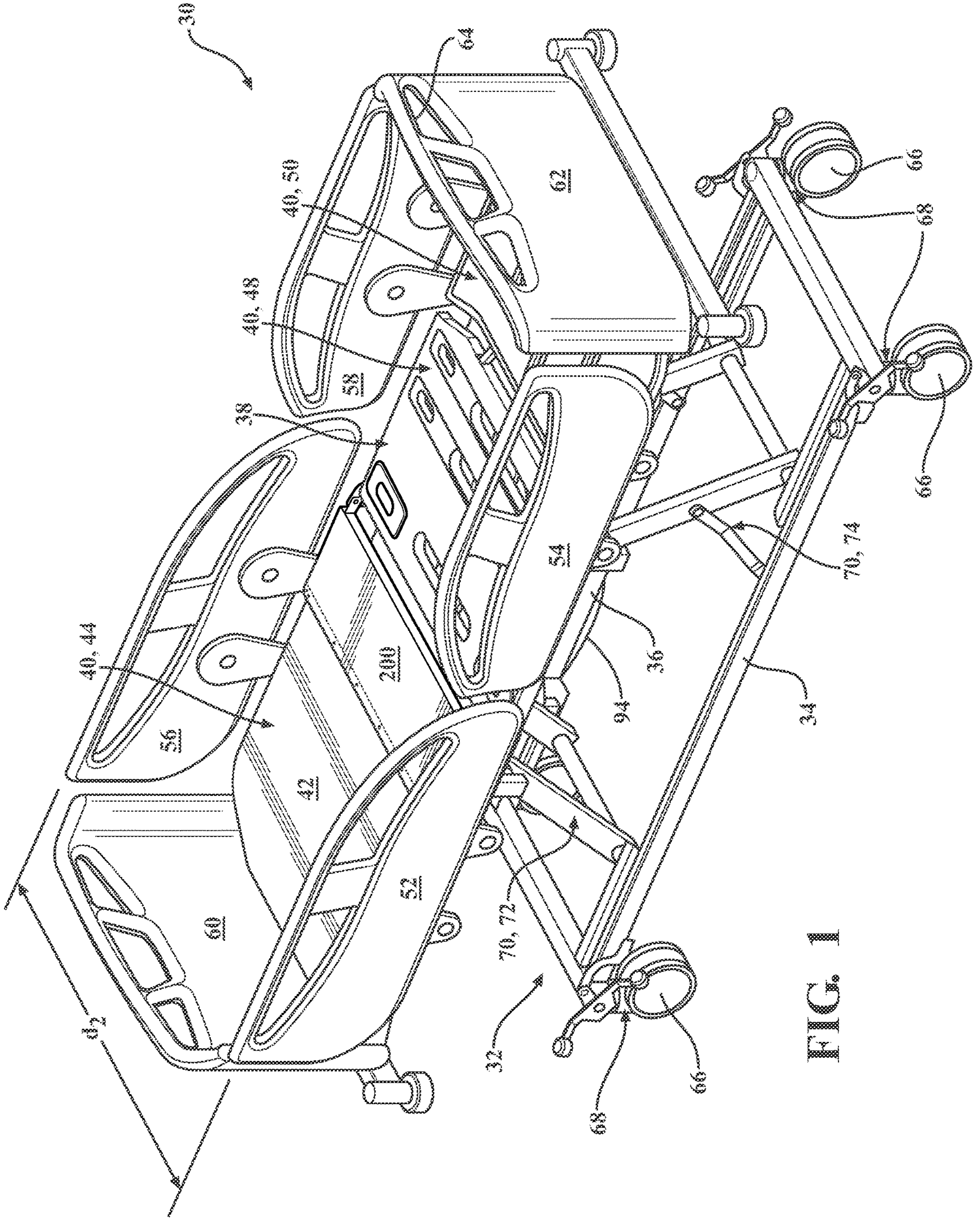
FIG. 1 is a perspective view of a patient support apparatus.

Referring to FIG. 1, a patient support apparatus 30 is shown for supporting a patient in a health care setting. The patient support apparatus 30 illustrated in FIG. 1 is realized as a hospital bed. In other embodiments, however, the patient support apparatus 30 may be a stretcher, cot, table, wheelchair, chair, or similar apparatus utilized in the care of a patient.

Figure 2:
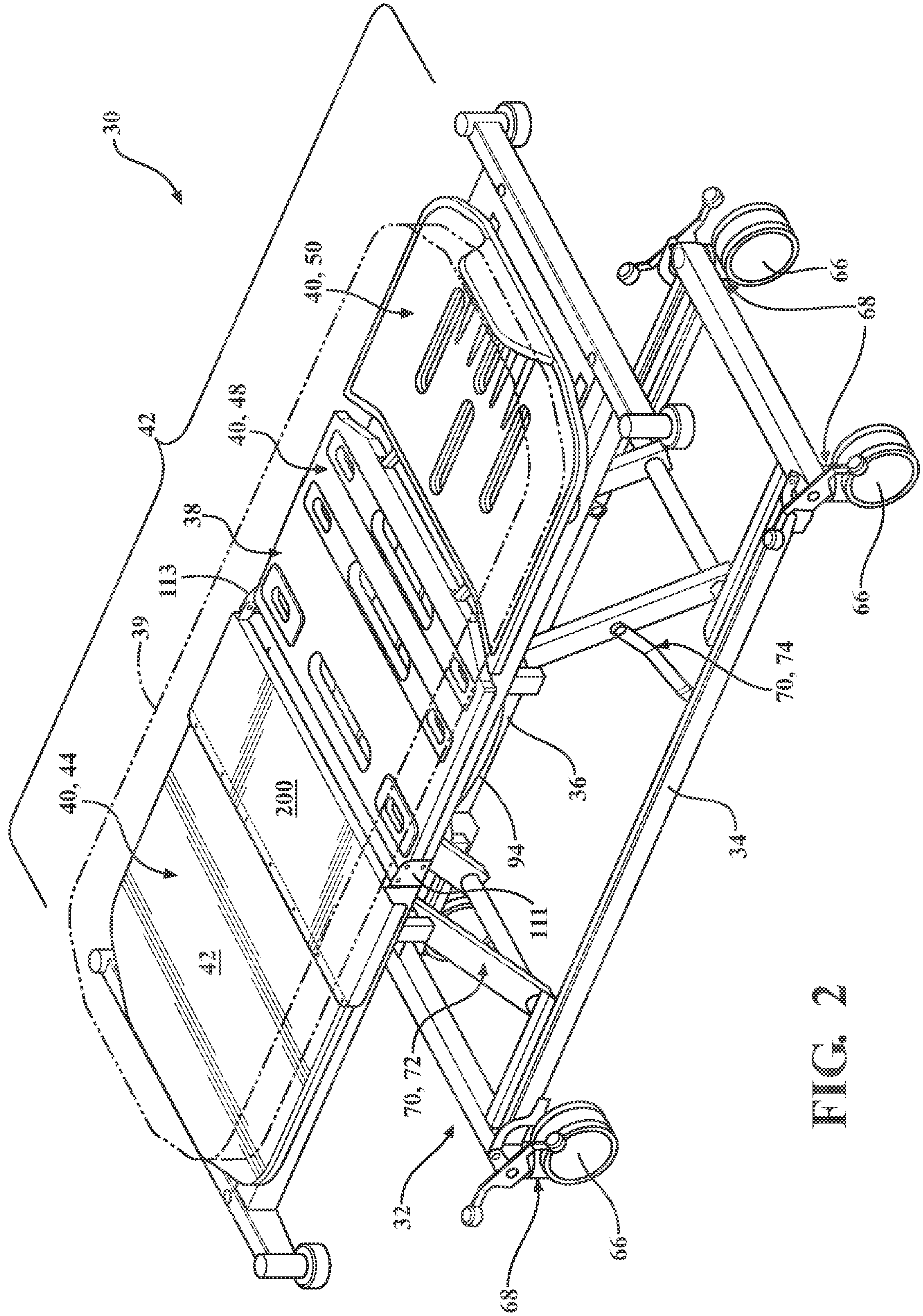
FIG. 2 is a perspective view of a portion of the patient support apparatus of FIG. 1, showing a base, a lift system, a support frame, and a patient support deck.

A support structure 32 provides support for the patient. The support structure 32 illustrated in FIGS. 1 and 2 comprises a base 34 and a support frame 36. The support frame 36 is spaced above the base 34 in FIGS. 1 and 2. The support structure 32 also comprises a patient support deck 38 operatively attached to the support frame 36 and carried by the support frame 36.

The patient support deck 38 includes a plurality of deck sections 40 that provide a patient support surface 42 upon which the patient is supported. More specifically, in the representative embodiment of the patient support apparatus 30 illustrated herein, the patient support deck 38 has three, or four, deck sections 40 which cooperate to define the patient support surface 42: a fowler deck section 44 (or back deck section), an optional seat deck section 46 (see FIGS. 5-8 and 10, which include the seat deck section 46 as an alternative embodiment), a leg deck section 48 and a foot deck section 50. The seat deck section 46, when present, may be fixed to the support frame 36 and not arranged for movement relative thereto, but in some versions the seat deck section 46 is movable. The fowler deck section 44 and the leg deck section 48 are arranged for independent movement relative to each other and to the support frame 36, and the foot deck section 50 is arranged to move partially concurrently with the leg deck section 48, as is described in greater detail below.

Figure 3:
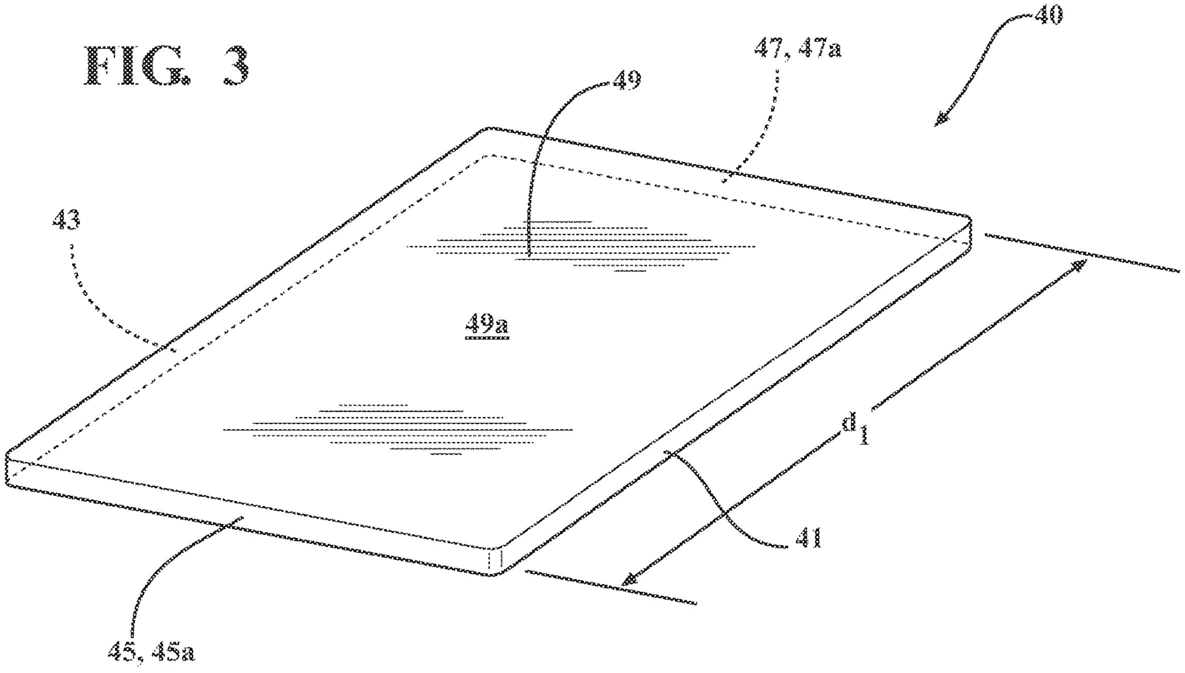
FIG. 3 is a perspective view of one of the deck sections of the patient support deck of FIG. 2.

In general, and as best illustrated in FIG. 3, each of the respective deck sections 40 includes a first edge portion 41, a second edge portion 43 spaced from and opposite the first edge portion 41, and a pair of spaced apart side edge portions 45, 47 that respectively connect the first and second edge portions 41, 43. The deck sections 40 also include a generally flat top panel portion 49 that extends between the respective edge portions 41, 43, 45, and 47. The deck sections also have a bottom portion 51 (see FIG. 6) opposing the generally flat top portion 49. The side edge portions 45, 47 each include a respective outer surface **45*a*, 47*a* that are separated by a distance d1. The flat top portion 49 has a top surface 49*a***.

Referring back to FIG. 1, side rails 52, 54, 56, 58 are coupled to the support frame 36 and/or the patient support deck 38 (e.g., the fowler deck section 44), and are thereby supported by the base 34. A first side rail 52 is positioned at a right head end of the support frame 36. A second side rail 54 is positioned at a right foot end of the support frame 36. A third side rail 56 is positioned at a left head end of the support frame 36. A fourth side rail 58 is positioned at a left foot end of the support frame 36. The first side rail 52 and the third side rail 56 may be mounted to the fowler deck section 44 to articulate with the fowler deck section 44, while the second side rail 54 and the fourth side rail 58 are mounted to the support frame 36 to move with the support frame 36. Other arrangements are also possible. If the patient support apparatus 30 is a stretcher or a cot, there may be fewer side rails. The side rails 52, 54, 56, 58 are movable between a raised position in which they block ingress and egress into and out of the patient support apparatus 30, one or more intermediate positions, and a lowered position in which they are not an obstacle to such ingress and egress. The distance d2 between a respective pair of the side rails 52, 56, and 54, 58 is greater than the distance d1 between the respective outer surface **45*a*, 47*a* of the deck sections 40. It will be appreciated that the patient support apparatus 30 may employ a different number of side rails, such as with a stretcher or a cot equipped with fewer side rails. Moreover, it will be appreciated that in certain configurations, the patient support apparatus 30** may not include any side rails.

A mattress (shown in phantom as 39 in FIG. 2) is disposed on the patient support deck 38 during use. In particular, the mattress 39 is disposed along the flat top portion 49 of each one of the respective deck sections 40 as described above. The mattress 39 comprises a secondary patient support surface upon which the patient is supported. The base 34, support frame 36, and patient support deck 38 each have a head end and a foot end corresponding to designated placement of the patient's head and feet on the patient support apparatus 30. The construction of the support structure 32 may take on any known or conventional design, and is not limited to that specifically set forth above. In addition, the mattress 39 may be omitted in certain embodiments, such that the patient rests directly on the patient support surface 42 of each of the respective deck sections 40.

As also shown in FIG. 1, a headboard 60 and a footboard 62 are coupled to the support frame 36. However, it will be appreciated that the headboard 60 and/or footboard 62 may be coupled to other locations on the patient support apparatus 30, such as the base 34, or may be omitted in certain embodiments.

One or more caregiver interfaces 64, such as handles, are shown integrated into the headboard 60, footboard 62, and the side rails 52, 54, 56, 58 to facilitate movement of the patient support apparatus 30 over floor surfaces. Additional caregiver interfaces 64 may be integrated into other components of the patient support apparatus 30. The caregiver interfaces 64 are graspable by the caregiver to manipulate the patient support apparatus 30 for movement. It will be appreciated that the caregiver interfaces 64 could be integrated with or operatively attached to any suitable portion of the patient support apparatus 30, or may be omitted in certain embodiments.

Wheels 66 are coupled to the base 34 to facilitate transport over the floor surfaces. The wheels 66 are arranged in each of four quadrants of the base 34 adjacent to corners of the base 34. In the embodiment shown, the wheels 66 are caster wheels able to rotate and swivel relative to the support structure 32 during transport. Each of the wheels 66 forms part of a caster assembly 68. Each caster assembly 68 is mounted to the base 34. It should be understood that various configurations of the caster assemblies 68 are contemplated. In addition, in some embodiments, the wheels 66 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels. In other embodiments, one or more auxiliary wheels (powered or non-powered), which are movable between stowed positions and deployed positions, may be coupled to the support structure 32. A fifth wheel may also be arranged substantially in a center of the base 34.

The patient support apparatus 30 further comprises a lift assembly, generally indicated at 70, which operates to lift and lower the support frame 36 relative to the base 34. The lift assembly 70 is configured to move the support frame 36 from a minimum height to a maximum height, or to any desired position in between. To that end, the lift assembly 70 comprises a head end lift member 72 and a foot end lift member 74 which are arranged to facilitate movement of the support frame 36 with respect to the base 34 using one or more lift actuators (not shown). The lift actuators may be realized as linear actuators, rotary actuators, or other types of actuators, and may be electrically operated, hydraulic, electro-hydraulic, or the like. It is contemplated that, in some embodiments, only one lift member and one associated actuator may be employed, e.g., to raise only one end of the support frame 36. The construction of the lift assembly 70, the head end lift member 72, and/or the foot end lift member 74 may take on any known or conventional design, and is not limited to that specifically illustrated. One exemplary lift assembly that can be utilized on the patient support apparatus 30 is described in U.S. Patent Application Publication No. 2016/0302985, entitled “Patient Support Lift Assembly”, which is hereby incorporated herein by reference in its entirety.

In each of the representative embodiments described herein, the patient support deck 38 is operatively attached to the support frame 36 and one or more of the deck sections 40 are arranged for individual movement relative to the support frame 36. To that end, one or more actuators 76 are arranged to move the respective one or more of the deck sections 40 relative to the support frame 36.

In the representative embodiments illustrated herein in FIGS. 4-12, a single actuator 76 is illustrated and described that is used to move the fowler deck section 44 between an initial and a raised configuration, and the single actuator 76 is realized as an electric linear actuator disposed in force-translating relationship between the fowler deck section 44 and the support frame 36. An additional actuator (not shown) can be included to raise or lower the other respective moveable deck sections, namely the leg deck section 48 and/or the foot deck section 50. In some embodiments, the actuators are driven using a controller (not shown) to move the deck sections 40 relative to the support frame 36 in response to input from a user via a user input device. The actuators may include any suitable form of actuators, such as electric, linear actuators or other suitable forms of actuators.

The actuator 76 has an actuator base 86 and an actuator shaft 88 configured to extend from the actuator base 86 between different linear positions, with a first linear position (see for example FIGS. 5, 7 and 10) and a second linear position (see for example FIGS. 4, 6, 8 and 11) illustrated herein. The actuator base 86 is operatively attached to cross member 87*a* of the support frame 36, and the actuator shaft 88 is pivotally coupled to a tension link 89 and to a c-shaped compression link 90. The tension link 89 is also pivotally coupled to a cross member 87*b* of the support frame 36 disposed closer to the headboard 60 than cross-member 87*a*. The c-shaped compression link 90 is pivotally coupled to the bottom portion 51 of the fowler deck section 44. A pair of spaced apart timing links 91 are also pivotally coupled to the bottom portion 51 of the fowler deck section 44 and to the support frame 36 at a position closer to the headboard 60. A cross member 92 extends between and supports the spaced apart timing links 91.

A pair of follower members 93 are respectively fixed to the bottom portion 51 of the fowler deck section 44. The follower members 93 extend from the bottom portion 51 to outer ends. Rollers 93B (see hidden lines in FIGS. 5 and 6) are rotatably coupled to the outer ends and ride within an interior portion of a respective one of a pair of curved slot members 94 which are fixed to an interior surface of the support frame 36.

Figure 5:
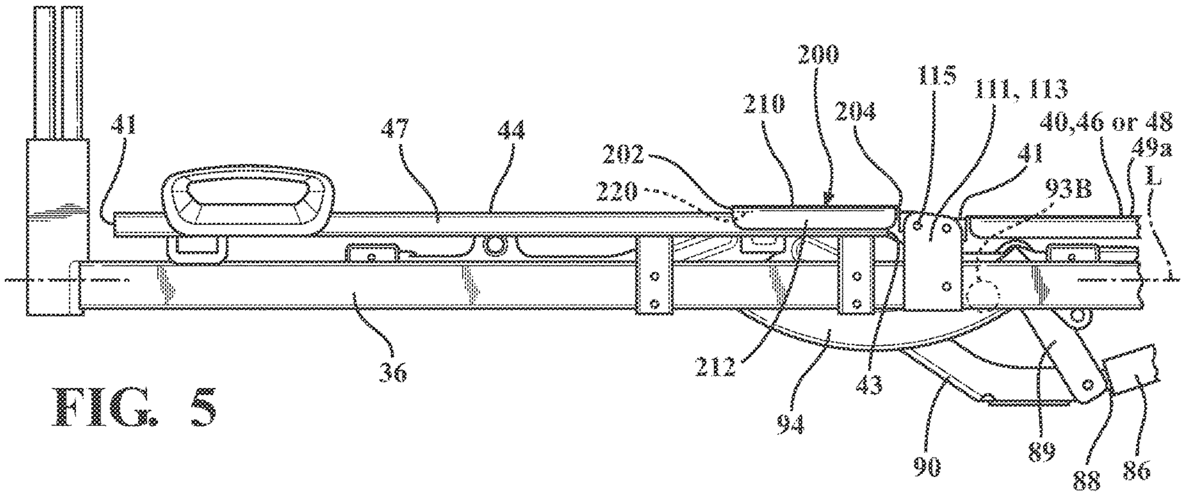
FIG. 5 is a side view of the patient support deck including the gap covering deck section slidingly coupled to the fowler deck section and pivotally coupled to the support frame in accordance with one embodiment, with the fowler deck section in an initial configuration and with an adjacent second deck section being either a seat deck section or a leg deck section.
Figure 6:
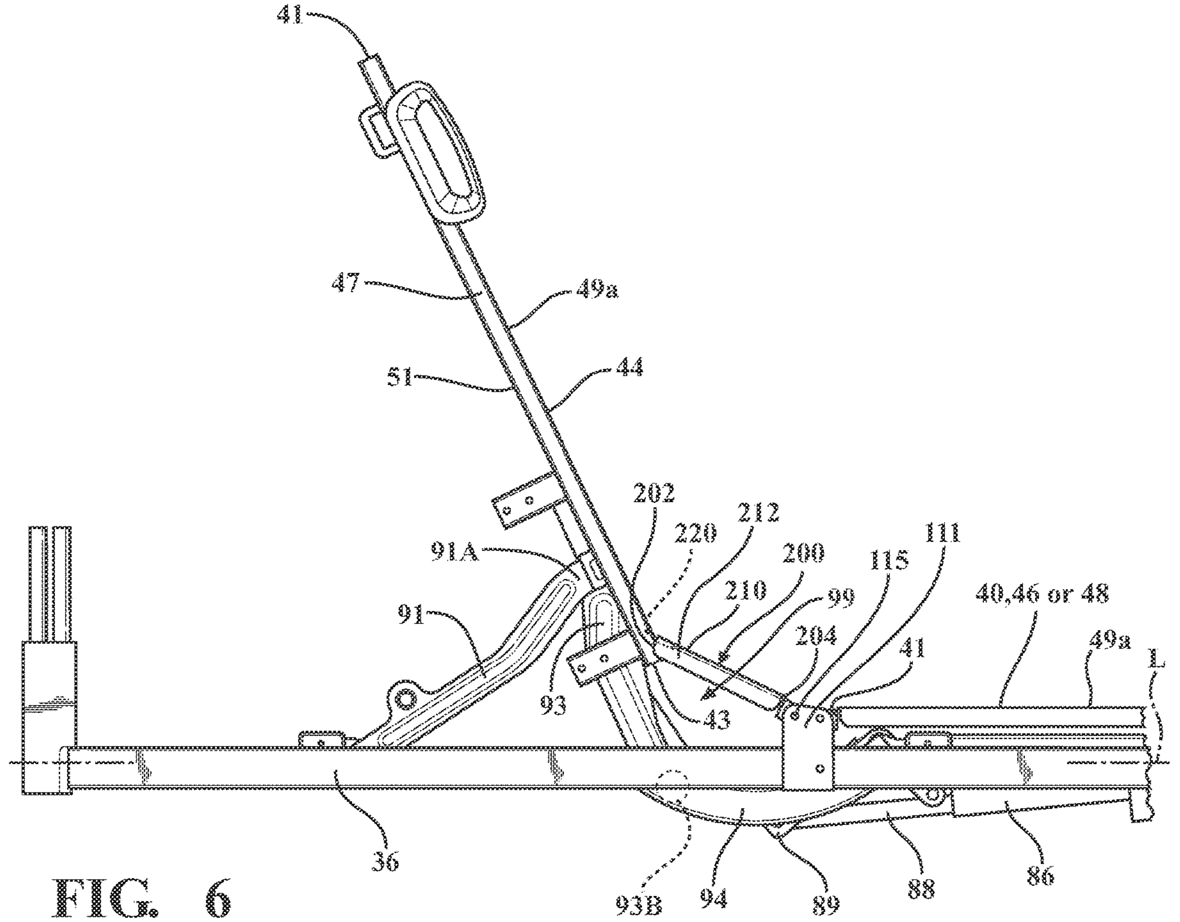
FIG. 6 is a side view of FIG. 5 with the fowler deck section in a raised configuration.

Here, movement of the actuator 76, whereby the shaft member 88 is moved such that it extends outwardly from the actuator base 86 (see, for example the movement of the shaft member 88 between an inward position in FIG. 5 to an outward position in FIG. 6) causes the fowler deck section 44 to move from an initial configuration (see FIG. 5) to a raised configuration (see FIG. 6).

Figure 4:
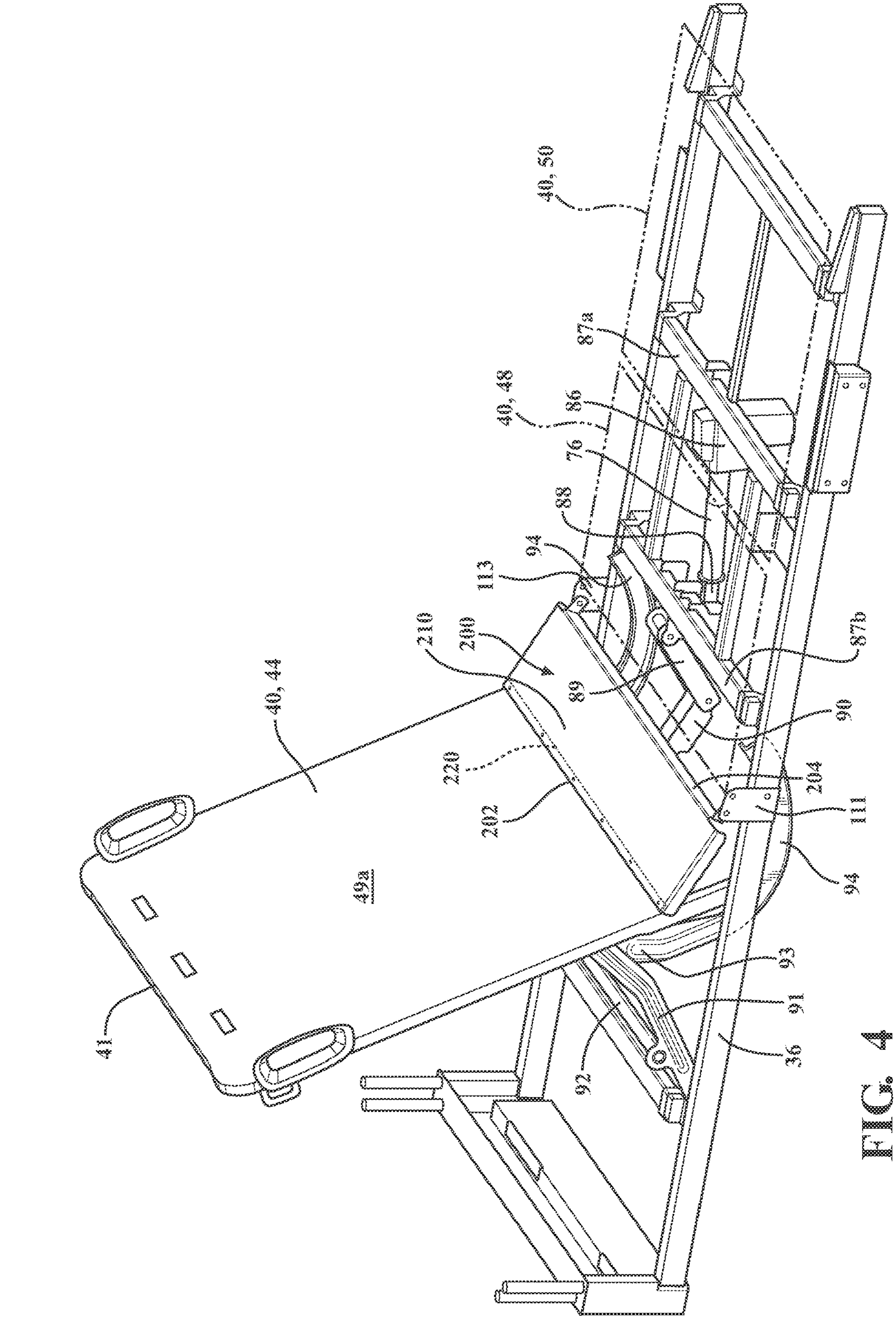
FIG. 4 is a perspective view of a portion of the support frame and patient support deck including a fowler deck section and a gap covering deck section coupled thereto, with the fowler deck section positioned in a raised configuration.

More specifically, the extension of the shaft member 88 applies force on the c-shaped compression link 90, thereby causing the tension link 89 to pivot towards the headboard 60 about the cross-member 87*b* (see FIG. 4). At the same time, the c-shaped compression link 90 applies force to the bottom portion 51 of the fowler deck section 44 to move the fowler deck section 44. At the same time, the rollers 93B of the follower members 93 roll within the curved slot members 44, and ends 91A of the pair of spaced apart timing links 91 located adjacent to the bottom portion 51 of the fowler deck section 44 move upward, thereby positioning the timing links 91 generally normal to the bottom portion 51 to enhance the stability of the fowler deck section 44 in the raised configuration.

The above-described operation and arrangement causes the first edge portion 41 of the fowler deck section 44 to move upwardly away from the support frame 36 (see for example a comparison of the positioning of the first edge portion 41 as it moves in FIGS. 5 and 6), and causes the second edge portion 43 to move in a direction longitudinally away from the adjacent deck section 40 to the raised configuration (shown as leftward movement of the second edge portion 43 relative to the adjacent deck section 40 when comparing the positioning from FIG. 5 to FIG. 6). Such longitudinal movement is defined with respect to a longitudinal axis L of the support frame 36. In certain embodiments, the first edge portion 41 may also move longitudinally away from the adjacent deck section 40, and the second edge portion 43 may move upwardly away from the support frame 36. The upward and longitudinal movement caused by operation of the actuator 76 provided herein, is generally in the form of movement of the fowler deck section 44 along an arcuate path.

It should be appreciated that similar upward and longitudinal movement, i.e., articulation and translation, of the fowler deck section 44 could be accomplished in other ways with other linkage arrangements. One such arrangement is disclosed, for example, in U.S. Patent Application Publication No. 2017/0367913, filed on Jun. 27, 2017, entitled, “Patient Support Apparatus with Deck Section Link,” which is hereby incorporated by reference herein in its entirety. Other arrangements are also contemplated.

The patient support apparatus 30 also includes a gap covering deck section 200 that is slidingly engaged to the top surface 49*a* of one of an adjacent pair of the deck sections 40 and is configured to articulate (e.g., pivot) relative to either the support frame 36 or to another one of the adjacent pair of the deck sections 40. The gap covering deck section 200 functions to be at least partially disposed over a gap 99 (see FIGS. 6, 8 and 11) between the adjacent pair of the deck sections 40 when a first one of the adjacent deck sections 40 is in a raised configuration.

The gap 99 refers to the opening that is created by the movement of the first one of the adjacent pair of the deck sections 40 from the initial configuration to the raised configuration by the actuator 76 (e.g., caused by the longitudinal movement of the fowler deck section 44 away from the adjacent deck section as described above), and is defined between the respective inner adjacent edges of the adjacent first and second deck sections 40 when the first one of the adjacent deck sections 40 is in the raised configuration. The gap 99, as defined herein, is not present when the first one of the adjacent pair of the deck sections 40 is in the initial configuration, even where the respective inner adjacent edges of the first one and the second one of the adjacent deck sections 40 are spaced relative to one another and are thus are not in abutting contact.

In certain embodiments, when the seat deck section 46 is not present, the first one of the adjacent pair of deck sections 40 refers to the fowler deck section 44 and the second one of the adjacent pair of deck sections refers to the leg deck section 48, and the gap 99 refers to the opening between the second edge portion 43 of the fowler deck section 44 and the first edge portion 41 of the leg deck section 48 when the fowler deck section 44 is in the raised configuration.

In other embodiments, when the seat deck section 46 is present, the first one of the adjacent pair of deck sections 40 refers to the fowler deck section 44 and the second one of the adjacent pair of deck sections refers to the seat deck section 46. In addition, the gap 99 refers to the opening between the second edge portion 43 of the fowler deck section 44 and the first edge portion 41 of the seat deck section 46 when the fowler deck section 44 is in the raised configuration.

The gap covering deck section 200, shown separated from the patient support apparatus 30 in FIG. 13A and coupled to a deck section 40 of the patient support apparatus 30 in FIG. 13B, is defined by a first edge portion 202, a second edge portion 204 spaced from and opposite the first edge portion 202, and a pair of spaced apart side edge portions 206, 208 that respectively connect the first and second edge portions 202, 204. The gap covering deck section 200 includes a generally flat top panel portion 210 that extends between the respective edge portions 202, 204, 206 and 208. The spaced apart side edge portions 206, 208 each include a flange guiding portion 212, 214 that extends generally normal to and in the same direction relative to the flat top panel portion 210 (shown wherein each of the flange guiding portions 212, 214 extend downward relative to the top panel portion 210 in FIGS. 13A and 13B).

The distance d2 between the inner surfaces 212*a*, 214*a* of these flange guiding portions 212, 214 is greater than the corresponding distance d1 between the outer surfaces 45*a*, 47*b* of the respective side edge portions 45, 47 of the deck section 40 to which the gap covering deck section 200 is slidingly or pivotably coupled. In addition, the distance d2 is less than the distance between a respective pair of the side rails 52, 56, and 54, 58. Accordingly, the inner surfaces 212*a*, 214*a* of these flange guiding portions 212, 214 are directly adjacent to, and external from, the respective outer surfaces 45*a*, 47*b* of the respective side edge portions 45, 47 of the deck section 40 to which the gap covering deck section 200 is slidingly or pivotably coupled and thus serve to maintain the positioning of the gap covering deck section 200 relative to the deck section 40 as the gap covering deck section 200 moves relative to the respective coupled deck section 40.

In certain embodiments, as also shown in FIGS. 13A, 13B and 13C, the first edge portion 202 of the gap covering deck section 200 includes a wear resistant material 220. In certain embodiments, the wear resistant material 220 is a hard plastic material, such as a low friction hard plastic material. In certain embodiments, such as shown in FIG. 13C, the wear resistant material 220 is molded into an opening 215 in the gap covering deck section 200 to aid in securing the wear resistant material 220 to the gap covering deck section 200. Representative wear resistant materials 220 that can be utilized include, but are not limited to, nylon or Delrin® (an acetal homopolymer commercially available from DowDu-Pont of Midland, Michigan and Wilmington, Delaware). As best shown in FIGS. 13B and 13C, the gap covering deck section 200 is preferably configured such that the wear resistant material 220 comprises the portion of the gap covering deck section 200 that is slidingly engaged to the top surface 49*a*, and remains slidingly engaged to the top surface 49*a*, of the deck section 40 to which it is slidingly engaged as the first one of the adjacent deck sections 40 moves from the initial configuration to the raised configuration.

FIGS. 5-12 below illustrate multiple alternative specific embodiments for coupling the gap covering deck section 200 to the adjacent pair of deck sections 40 that provide a support structure for the mattress 39 (when present) over the gap 99 when the first one of the adjacent deck sections is moved to the raised configuration. For ease of illustration and viewing, the mattress 39 is not illustrated in FIGS. 5-12.

In one embodiment, as illustrated in FIGS. 5-6, the first one of the adjacent deck sections 40 refers to the fowler deck section 44 and the second one of the adjacent deck sections 40 refers to the seat deck section 46 or the leg deck section 48, and the gap covering deck section 200 is pivotably coupled to a pair of spaced apart brackets 111, 113 (see also FIG. 4) of the support frame 36. The gap covering deck section 200 is also slidingly coupled to the top surface 49*a* of the fowler deck section 44.

In particular, each of the flange guiding portions 212, 214 near the second edge portion 204 of the gap covering deck section 200 are positioned adjacent to the brackets 111, 113. A fixing device 115 is inserted through openings in the respective flange guiding portions 212, 214 and through axially aligned openings in the brackets 111, 113 to secure the gap covering deck section 200 to each of the brackets 111, 113. Preferably, the fixing device 115 is in the form of a pin or a bolt, which defines an axis such that the gap covering deck section 200 is pivotable or otherwise rotatable about the axis. As illustrated in FIGS. 5 and 6, the flange guiding portions 212, 214 are located outwardly with respect to the brackets 111, 113, although in alternative equivalent embodiments the flange guiding portions 212, 214 could be located inwardly with respect to the brackets 111, 113 as well.

Near the first edge portion 202 of the gap covering deck section 200, the flange guiding portions 212, 214 are positioned outwardly of, and adjacent to, the spaced apart side edge portions 45, 47 of the fowler deck section 44 and the first edge portion 202, with or without the wear resistant material 220, is disposed on and engaged with the top surface 49*a* of the fowler deck section 44.

In this embodiment, when the fowler deck section 44 is moved from the initial configuration (see FIG. 5) to the raised configuration (see FIG. 6), via the movement along the arcuate path as described above, the first edge portion 202 of the gap covering deck section 200, with or without the wear resistant material 220, slides along the top surface 49*a* of the fowler deck section 44 towards the second edge portion 43 and away from the first edge portion 41. At the same time, the flange portions 212, 214 slide adjacent to the spaced apart side edge portions 45, 47 of the fowler deck section 44 towards the second edge portion 43 and away from the first edge portion 41. As such, a portion of the gap covering deck section 200 is disposed above the gap 99 relative to the support frame 36 when the fowler deck section 44 is in the raised configuration, as shown in FIG. 6.

Further, when the fowler deck section 44 is returned to the initial configuration from the raised configuration, thereby eliminating the gap 99 as described above, the first edge portion 202 of the gap covering deck section 200, with or without the wear resistant material 220, slides along the top surface 49*a* of the fowler deck section 44 away from the second edge portion 43 and towards the first edge portion 41 to its original position. At the same time, the flange portions 212, 214 slide adjacent to the spaced apart side edge portions 45, 47 of the fowler deck section 44 away from the second edge portion 43 and towards the first edge portion 41 to their original position. In the initial configuration, a greater portion of the gap covering deck section 200 is disposed adjacent to the top surface 49*a* of the underlying fowler deck section 44 than in the raised configuration.

Figure 7:
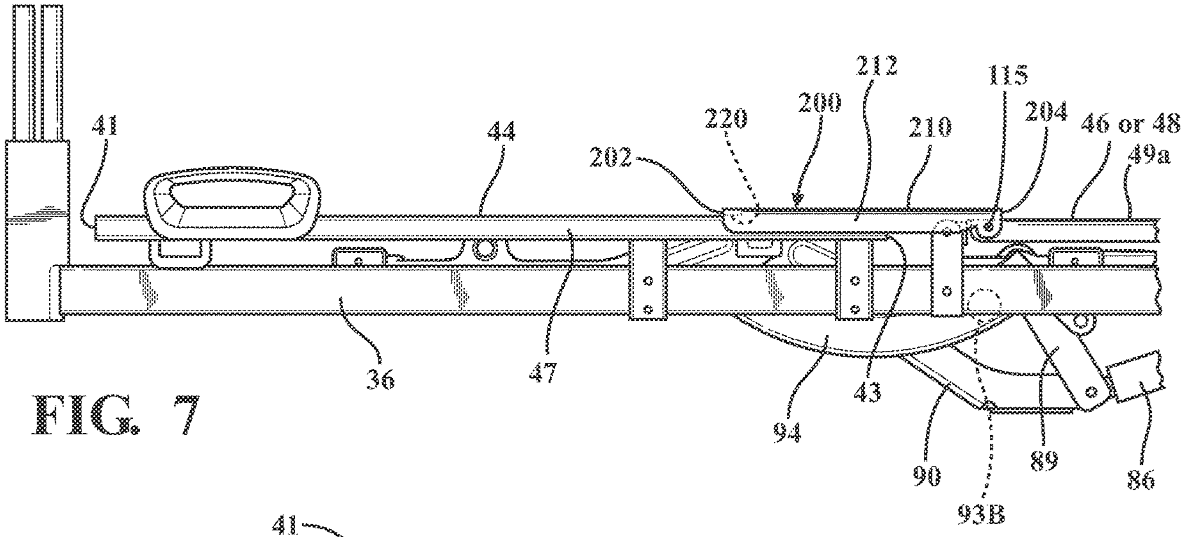
FIG. 7 is a side view of the patient support deck including a gap covering deck section slidingly coupled to the fowler deck section and pivotally coupled to an adjacent second deck section in accordance with another embodiment, with the fowler deck section and the adjacent second deck section in an initial configuration and with the adjacent second deck section being either a seat deck section or a leg deck section.
Figure 8:
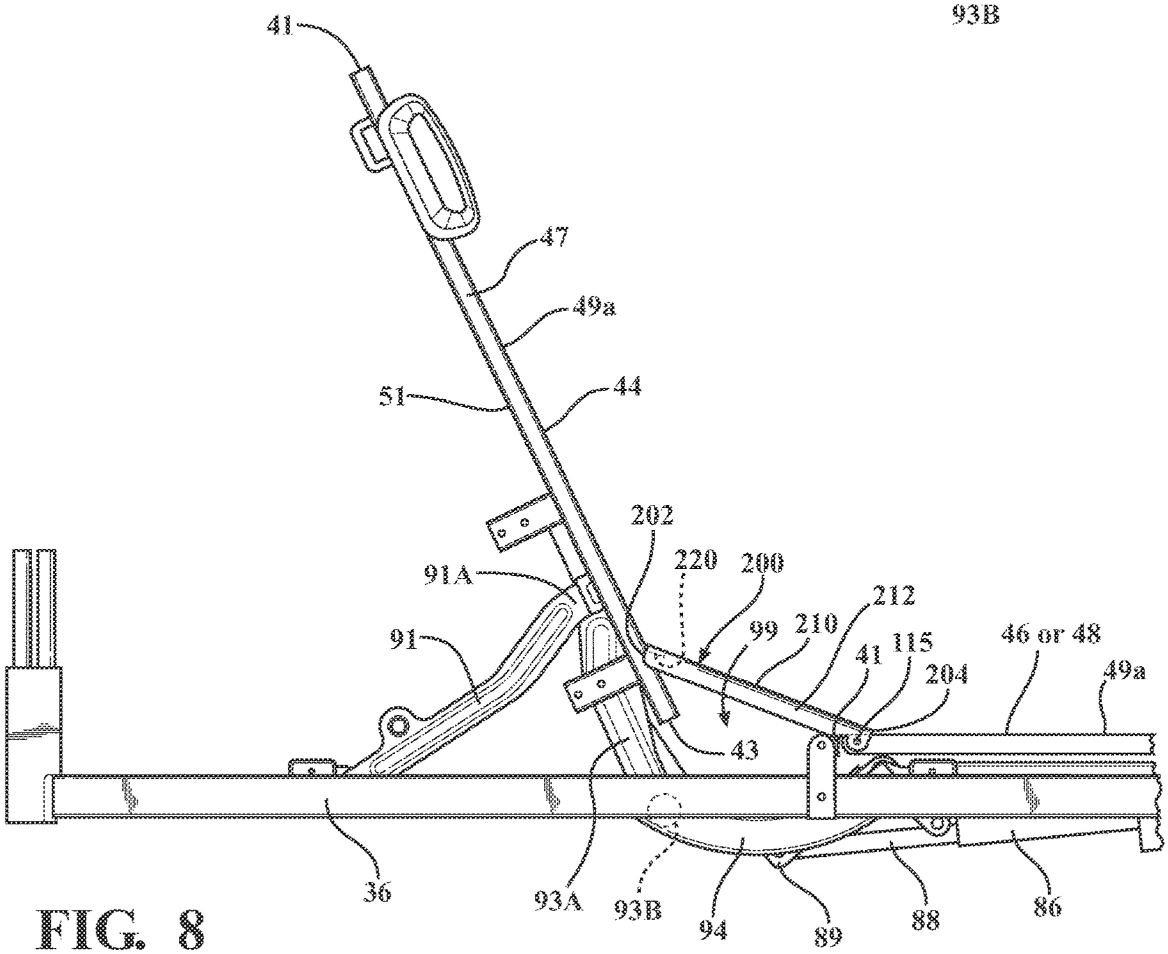
FIG. 8 is a side view of FIG. 7 with the fowler deck section in a raised configuration and the adjacent second deck section in the initial configuration.
Figure 9:
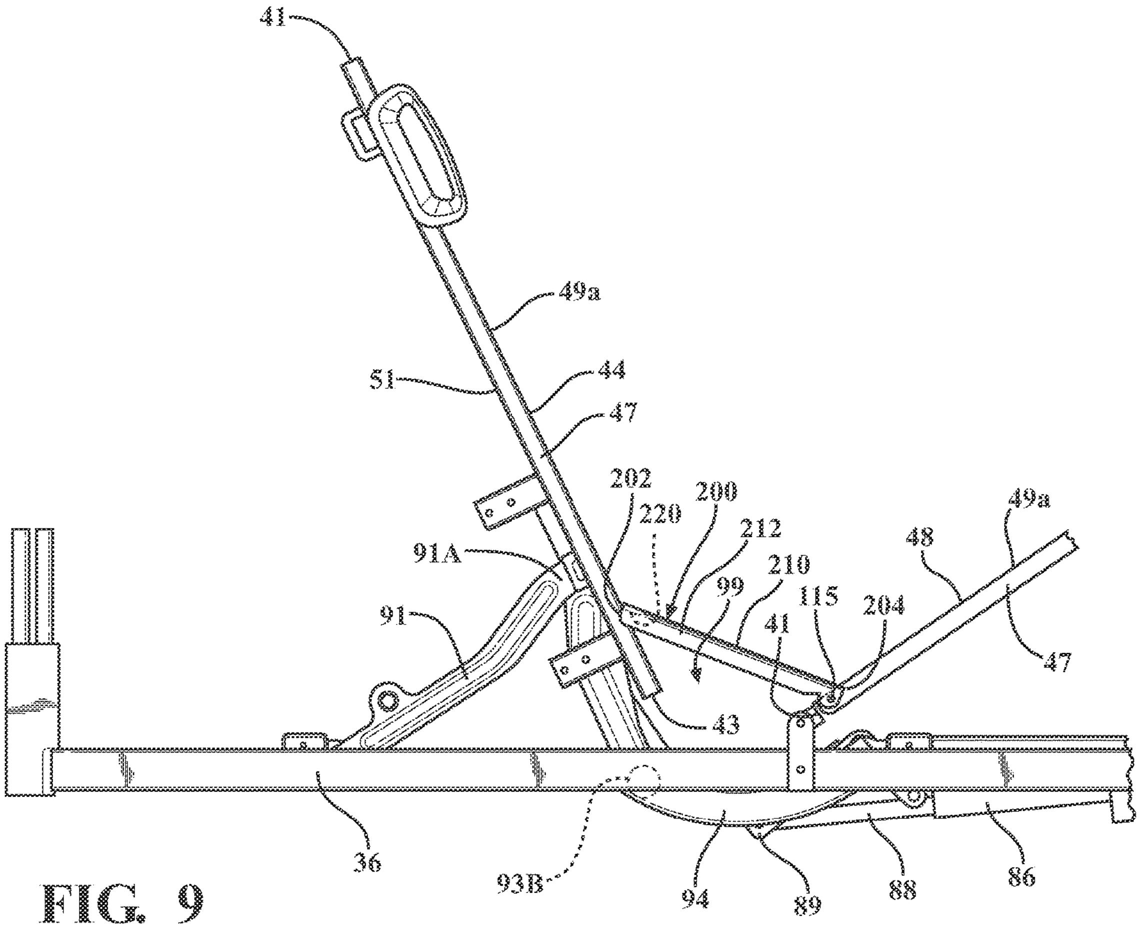
FIG. 9 is a side view of FIG. 7 with the fowler deck section in a raised configuration and with the adjacent second deck section comprising a leg deck section in a raised configuration.

In an alternative embodiment, as illustrated in FIGS. 7-9, the first one of the adjacent pair of deck sections 40 refers to the fowler deck section 44 and the second one of the adjacent pair of deck sections 40 refers to the seat deck section 46 or the leg deck section 48, and the gap covering deck section 200 is configured to articulate (e.g., pivot) relative to the seat deck section 46 or the leg deck section 48 and is slidingly coupled to the top surface 49*a* of the fowler deck section 44.

In particular, the flange guiding portions 212, 214 near the first edge portion 202 are positioned outwardly of, and adjacent to, the spaced apart side edge portions 45, 47 of the fowler deck section 44 and the first edge portion 202, with or without the wear resistant material 220, is disposed on and engaged with the top surface 49*a* of the fowler deck section 44. In addition, each of the flange guiding portions 212, 214 near the second edge portion 204 are positioned outwardly of, and adjacent to, the spaced apart side edge portions 45, 47 of the seat deck section 46 or leg deck section 48. A fixing device 115 is inserted through openings in the respective flange guiding portions 212, 214 and through axially aligned openings in the seat deck section 46 or the leg deck section 48 to secure the gap covering deck section 200 to the seat deck section 46 or leg deck section 48. Preferably, the fixing device 115 is in the form of a pin or a bolt, which defines an axis such that the gap covering deck section 200 is pivotable or otherwise rotatable about the axis.

In this embodiment, when the fowler deck section 44 is moved from the initial configuration (see FIG. 7) to the raised configuration (See FIG. 8), via the movement along the arcuate path as described above, the first edge portion 202 of the gap covering deck section 200, with or without the wear resistant material 220, slides along the top surface 49*a* of the fowler deck section 44 towards the second edge portion 43 and away from the first edge portion 41. At the same time, the flange portions 212, 214 slide adjacent to the spaced apart side edge portions 45, 47 of the fowler deck section 44 towards the second edge portion 43 and away from the first edge portion 41. As such, and similar to the embodiment of FIGS. 5 and 6, a portion of the gap covering deck section 200 is disposed above the gap 99 relative to the support frame 36.

Further, when the fowler deck section 44 is returned to the initial configuration from the raised configuration, thereby eliminating the gap 99 as described above, the first edge portion 202 of the gap covering deck section 200, with or without the wear resistant material 220, slides along the top surface 49*a* of the fowler deck section 44 away from the second edge portion 43 and towards the first edge portion 41 to its original position. At the same time, the flange portions 212, 214 slide adjacent to the spaced apart side edge portions 45, 47 of the fowler deck section 44 away from the second edge portion 43 and towards the first edge portion 41 to their original respective positions. In the initial configuration, a greater portion of the gap covering deck section 200 is disposed adjacent to the top surface 49*a* of the underlying fowler deck section 44 than in the raised configuration.

As shown in FIG. 9, when the second deck section 40 is the leg deck section 48, a further aspect of this embodiment is realized where the fowler deck section 44 is in the raised position and where the leg deck section 48 is also pivoted such that its second end portion 43 (not shown in FIG. 9) is spaced further away from the support frame 36. Notably, because the leg deck section 48 is only pivoted, and does not move longitudinally away from the fowler deck section 44 along an arcuate path, the size of the gap 99 is not increased. As such, the gap covering deck section 200 remains in place over the gap 99. Of course, in other embodiments, the leg deck section 48 may also move longitudinally away from the fowler deck section 44 to increase the gap 99, in which case, the gap covering deck section 200 is sized to accommodate such increases in the gap 99.

Figure 10:
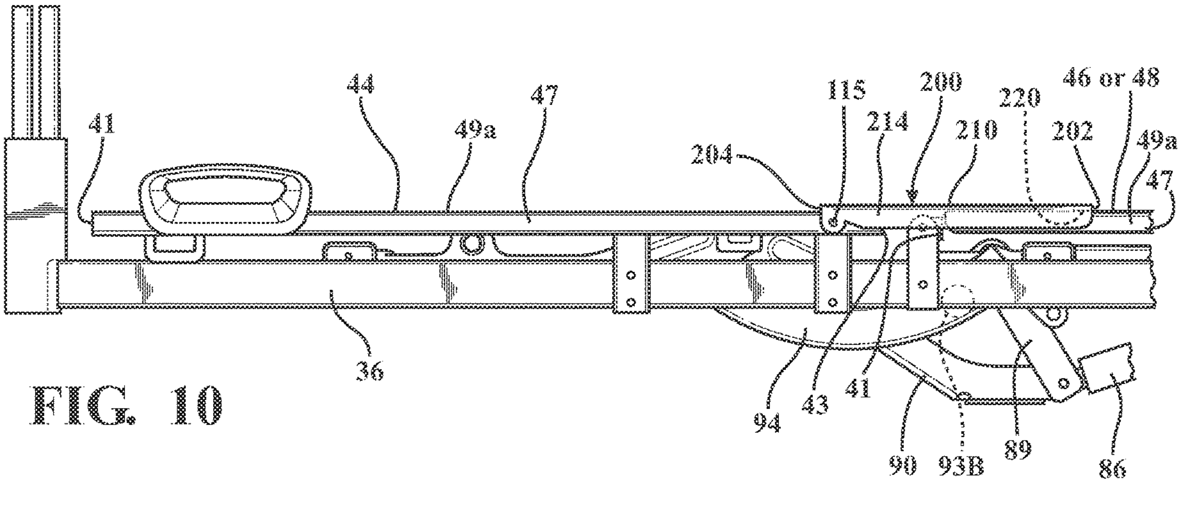
FIG. 10 is a side view of the patient support deck including a gap covering deck section pivotally coupled to the fowler deck section and slidingly coupled to an adjacent second deck section in accordance with yet another embodiment, with the fowler deck section and the adjacent second deck section in an initial configuration and with the adjacent second deck section being either a seat deck section or a leg deck section.
Figure 11:
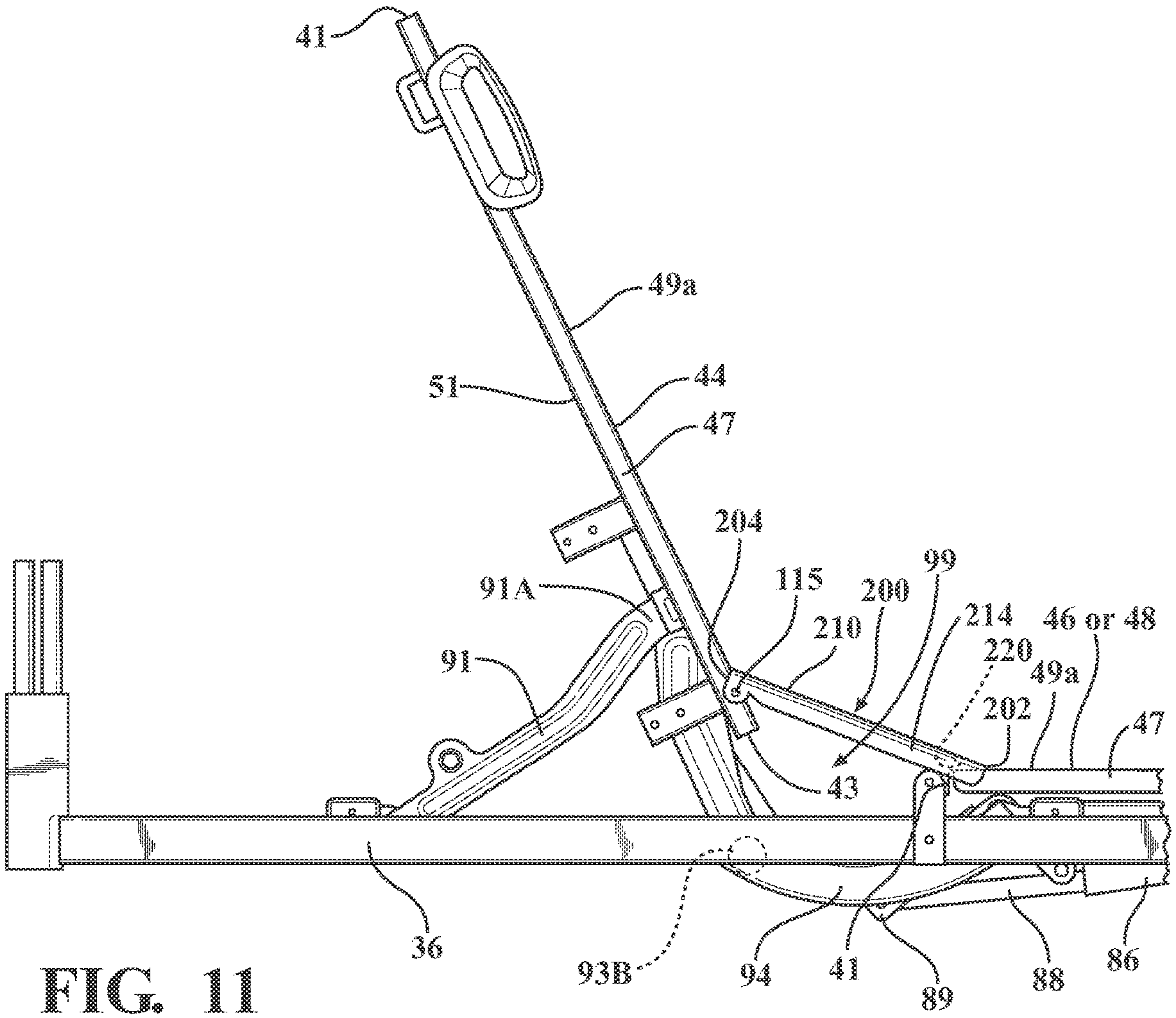
FIG. 11 is a side view of FIG. 10 with the fowler deck section in a raised configuration.
Figure 12:
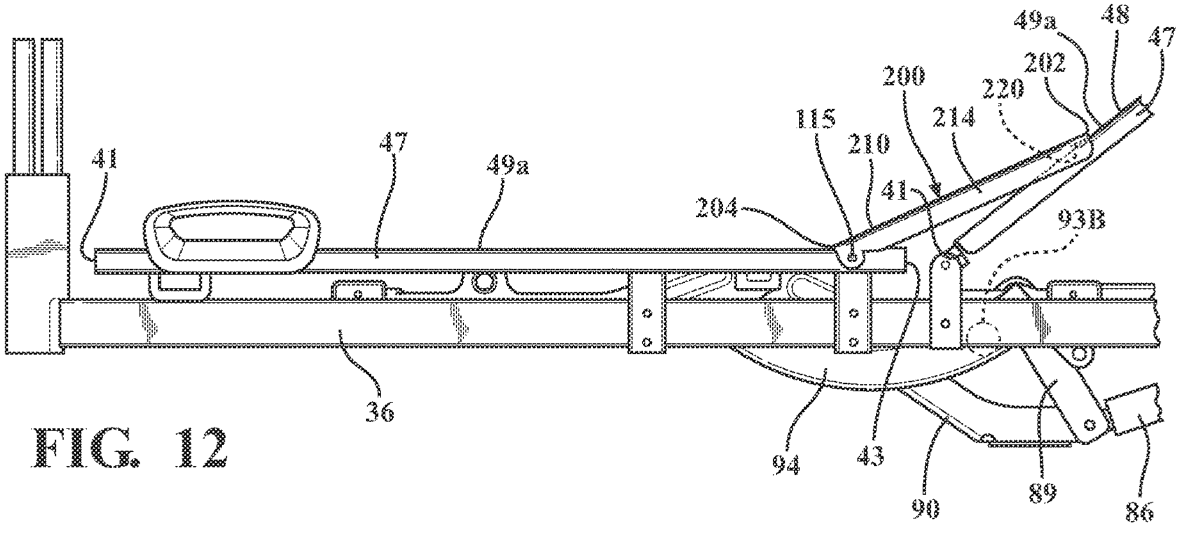
FIG. 12 is a side view of FIG. 10 with the fowler deck section in an initial configuration and with the second deck section comprising a leg deck section in a raised configuration.

In another alternative embodiment, the coupling of the gap covering deck section 200 as provided in FIGS. 7-9 is reversed. Accordingly, in this embodiment, as illustrated in FIGS. 10-12, the gap covering deck section 200 is pivotably coupled to the fowler deck section 44 and is slidingly coupled to the top surface 49*a* of the seat deck section 46 or the leg deck section 48.

In particular, the flange guiding portions 212, 214 near the second edge portion 204 of the gap covering deck section 200 are positioned outwardly of and adjacent to the spaced apart side edge portions 45, 47 of the seat deck section or leg deck section 48 and the first edge portion 202 (with or without the wear resistant material 220) of the gap covering deck section 200 is disposed on and engaged with a top surface 49*a* of the seat deck section 46 or the leg deck section 48. In addition, each of the flange guiding portions 212, 214 near the first edge portion 202 of the gap covering deck section 200 are positioned outwardly of, and adjacent to, the spaced apart side edge portions 45, 47 of the fowler deck section 44. A fixing device 115 is inserted through openings in the respective flange guiding portions 212, 214 and through axially aligned openings in the fowler deck section 44 to secure the gap covering deck section 200 to fowler deck section 44. Preferably, the fixing device 115 is in the form of a pin or a bolt, which defines an axis such that the gap covering deck section 200 is pivotable or otherwise rotatable about the axis.

In this embodiment, when the fowler deck section 44 is moved from the initial configuration (see FIG. 10) to the raised configuration (see FIG. 11), via the movement along the arcuate path as described above, the first edge portion 202 of the gap covering deck section 200, with or without the wear resistant material 220, slides along the top surface 49*a* of the seat deck section 46 or leg deck section 48 towards the first edge portion 41 and away from the second edge portion 43. At the same time, the flange portions 212, 214 slide adjacent to the spaced apart side edge portions 45, 47 of the seat deck section 46 or leg deck section 48 towards the first edge portion 41 and away from the second edge portion 43. As such, a portion of the gap covering deck section 200 is disposed above the gap 99 relative to the support frame 36.

Further, when the fowler deck section 44 is returned to the initial configuration from the raised configuration, thereby eliminating the gap 99 as described above, the first edge portion 202 of the gap covering deck section 200, with or without the wear resistant material 220, slides along the top surface 49*a* of the seat deck section 46 or leg deck section 48 toward the second edge portion 43 and away from the first edge portion 41 to its original position. At the same time, the flange portions 212, 214 slide adjacent to the spaced apart side edge portions 45, 47 of the seat deck section 46 or leg deck section 48 toward the second edge portion 43 and away from the first edge portion 41 to their original positions. In the initial configuration, a greater portion of the gap covering deck section 200 is disposed adjacent to the top surface 49*a* of the underlying seat deck section 46 or leg deck section 48 than in the raised configuration.

As shown in FIG. 12, when the second deck section 40 is a leg deck section 48, a further aspect of this embodiment is realized where the fowler deck section 44 is in the raised position and where the leg deck section 48 is also pivoted such that its second end portion 43 (not shown in FIG. 12) is spaced further away from the support frame 36. Notably, because the leg deck section 48 is only pivoted, and does not move longitudinally away from the fowler deck section 44 along an arcuate path, the size of the gap 99 is not increased. Of course, in other embodiments, the leg deck section 48 may also move longitudinally away from the fowler deck section 44 to increase the gap 99, in which case, the gap covering deck section 200 is sized to accommodate such increases in the gap 99.

The inclusion of a gap covering deck section 200, in any of the embodiments described herein, provides a solution for preventing the displacement of the mattress 39 into the gap created by the pivotal and translational movement of the fowler deck section 44 relative to the adjacent deck section 40. Further, the gap covering deck section 200 also prevents the associated movement of a patient positioned on the mattress 39 of the patient support deck 38 from shifting downward within the gap 99.

Referring now to FIGS. 14-18, another embodiment of the patient support apparatus 30 is provided. In this further embodiment, the shape and width of the gap covering deck section 500 (defined between the pair of spaced apart side edge portions 506, 508) has been modified as compared to the shape and width of the gap covering deck sections 200 provided in the embodiments of FIGS. 1-13. In addition, the coupling of the gap covering deck section 500 between an adjacent pair of the deck sections 40, and the coupling of the respective adjacent pair of deck sections 40, has been modified as compared to the embodiments of FIGS. 1-13. Even still further, in certain embodiments according to FIGS. 14-18, the coupling of the wear resistant material 520 to the first edge portion 502 of the gap covering deck section 500 has also been modified as compared to the coupling of the wear resistant material 220 to the first edge portion 202 of the gap covering deck section 200 in the embodiment illustrated in FIG. 13C corresponding to the embodiments of FIGS. 1-13. Each of the modifications introduced above will be described in greater detail below.

In the embodiment illustrated in FIGS. 14-18, the first one of the adjacent pair of deck sections 40 refers to the fowler deck section 44, and the second one of the adjacent pair of deck sections 40 refers to the leg deck section 48. However, it will be appreciated that the first one of the adjacent pair of deck sections 40 could refer to the leg deck section 48, and the second one of the adjacent pair of deck sections 40 could refer to fowler deck section 44 in some embodiments. Similarly, the first one of the adjacent pair of deck sections 40 could refer to the fowler deck section 44, and the second one of the adjacent pair of deck sections 40 could refer to the seat deck section 46. Moreover, the first one of the adjacent pair of deck sections 40 could refer to the seat deck section 46, and the second one of the adjacent pair of deck sections 40 could refer to a fowler deck section 44. In embodiments including the seat deck section 46, in some embodiments, the seat deck section 46 could be stationary, secured such as directly to the support frame 36. Other configurations are contemplated.

Figure 14:
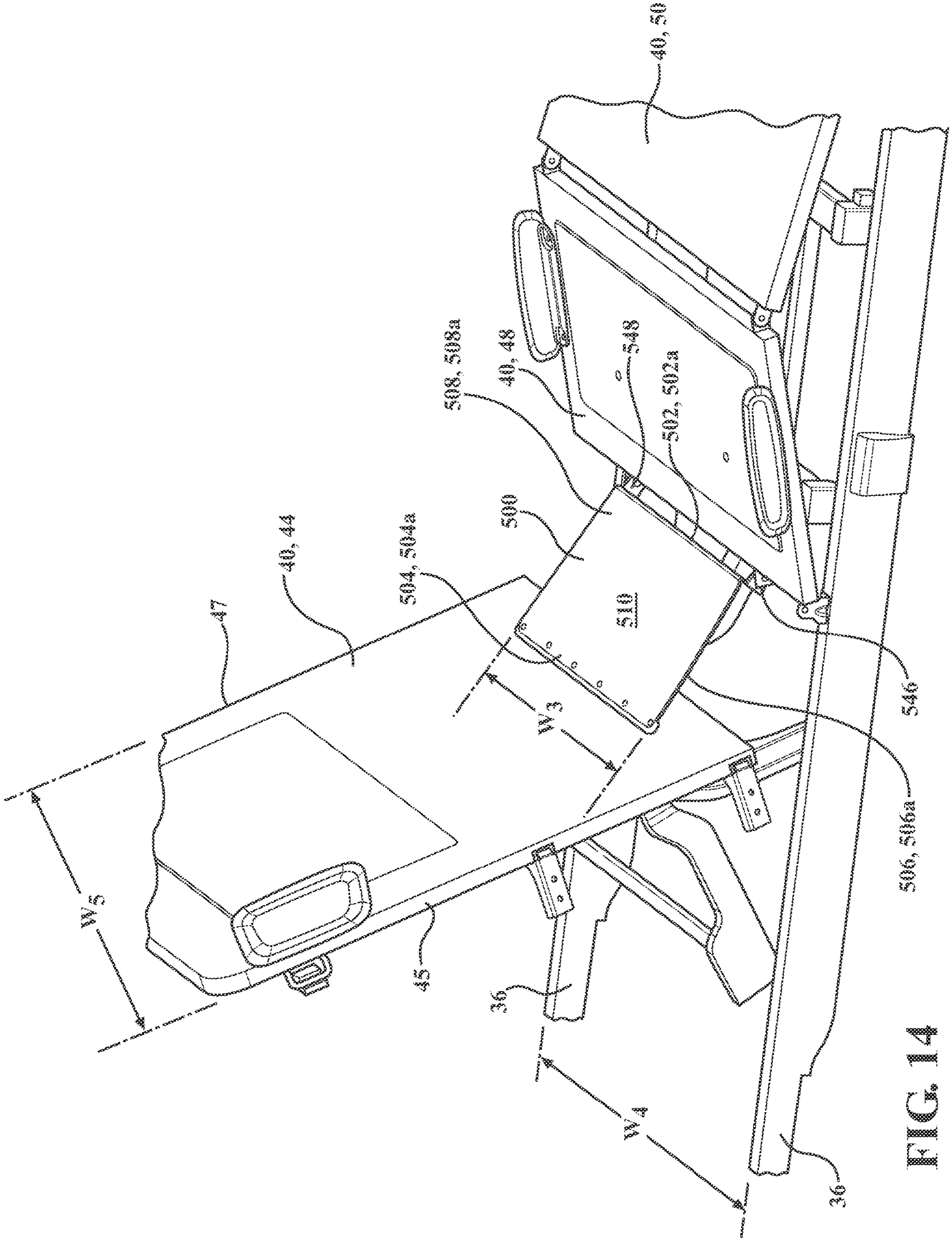
FIG. 14 is a perspective view of a portion of the support frame and patient support deck according to another embodiment including a fowler deck section and a gap covering deck section coupled thereto, with the fowler deck section positioned in a raised configuration.
Figure 15:
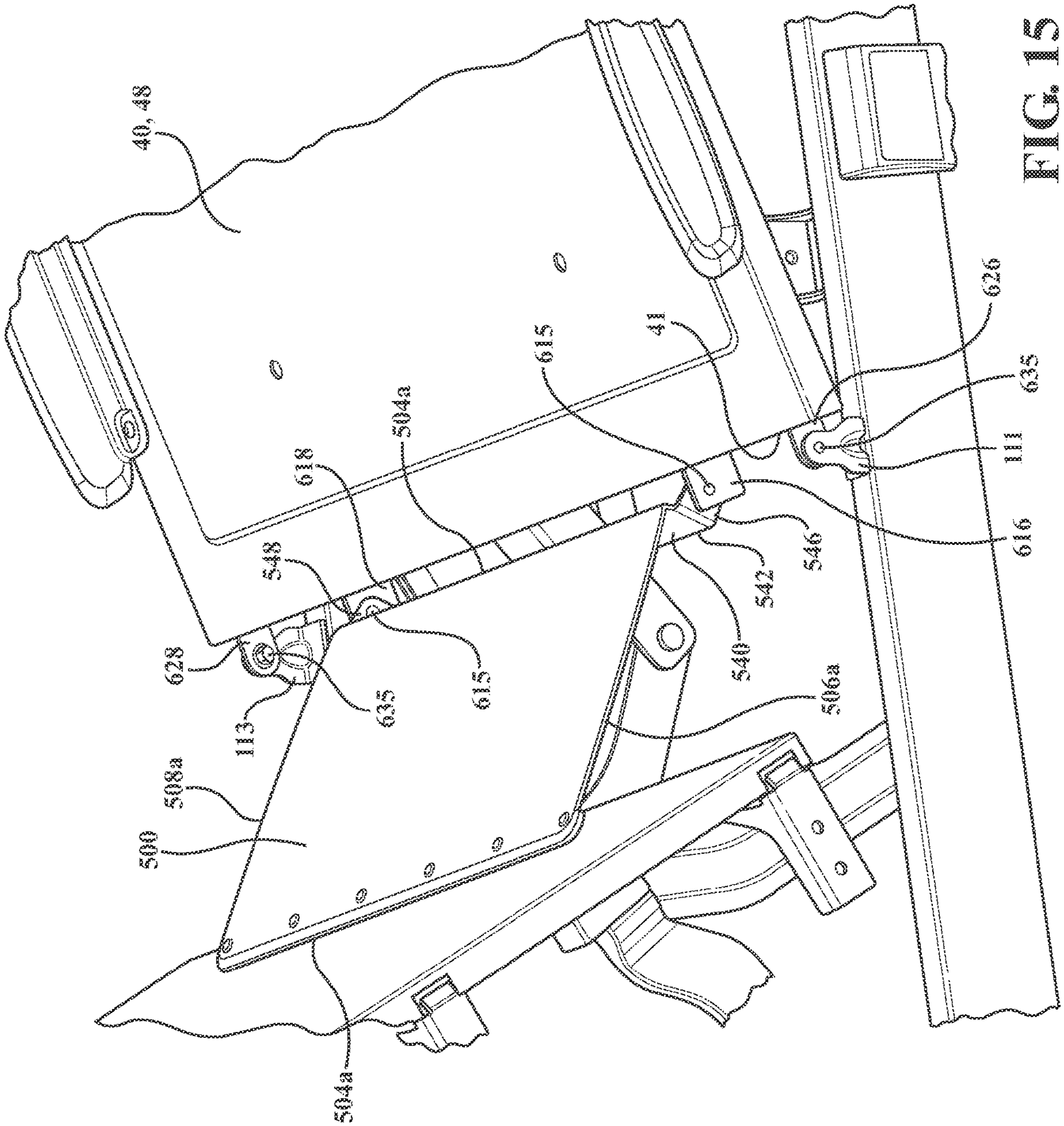
FIG. 15 is another perspective view of FIG. 14.
Figure 16:
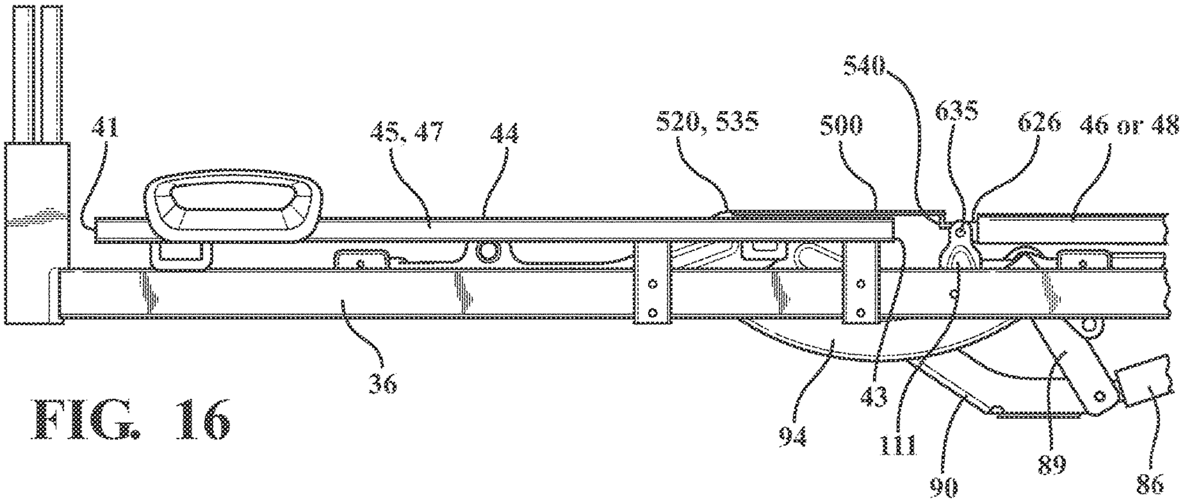
FIG. 16 is a side view of the patient support deck of FIG. 14 including the gap covering deck section slidingly coupled to the fowler deck section and pivotally coupled to the support frame in accordance with one embodiment, with the fowler deck section in an initial configuration and with an adjacent second deck section being either a seat deck section or a leg deck section in the initial configuration.

The gap covering deck section 500, shown pivotally coupled to the second one of the adjacent pair of deck sections 40 in FIGS. 14 and 15 (and more specifically shown coupled to the leg deck section 48 of the patient support apparatus 30 in FIGS. 14 and 15), is defined by a first edge portion 502, a second edge portion 504 spaced from and opposite the first edge portion 502, and a pair of spaced apart side edge portions 506, 508 that respectively connect the first and second edge portions 502, 504. The gap covering deck section 500 includes a generally flat top panel portion 510 that extends between the respective edge portions 502, 504, 506 and 508. Each of the edge portions 502, 504, 506, and 508 includes a respective outer surface 502*a*, 504*a*, 506*a*, and 508*a*. In certain embodiments, such as shown in FIGS. 14-18, where the flat top panel portion 510 is rectangular in shape, the respective opposing outer surfaces 502*a* and 504*a*; 506*a* and 508*a* are generally parallel with respect to one another. As also shown in FIGS. 14-18, the width w3 of the gap covering section 500, defined between the outer surfaces 506*a*, 508*a* of the pair of spaced apart side edge portions 506, 508, is less than the width w4 within the support frame 36 (corresponding to the width between a respective pair of the side rails 52, 56 or 54, 58 disposed onto and over the support frame 36). In addition, in certain embodiments, the width w3 is also less than the width w5 between the respective side edge portions 45, 47 of the first one of the pair of deck sections 40, 44.

Figure 18:
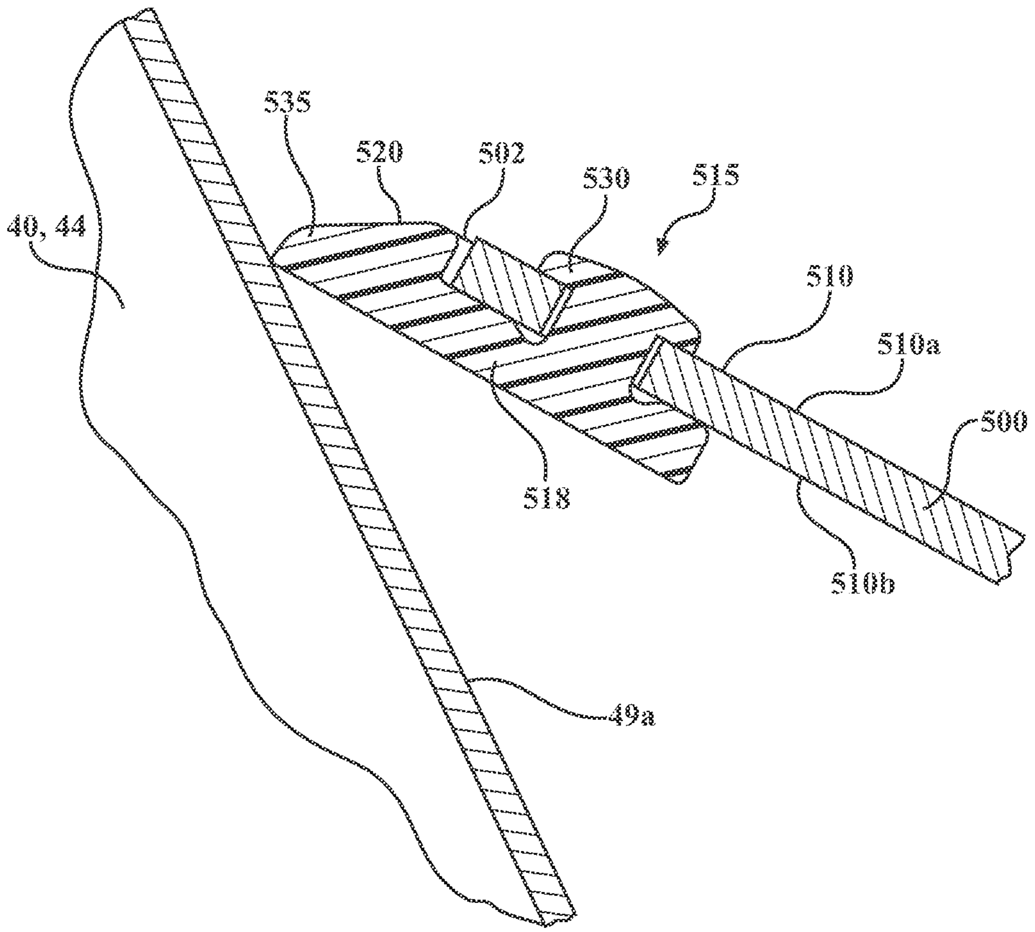
FIG. 18 is a close-up and partially cross-section view of the adjacent deck section and the gap covering deck section of FIG. 14 taken along line 18-18 in which the wear resistant material is slidingly engaged to a top surface of one of the adjacent deck sections and illustrating the coupling of the wear resistant material to the gap covering deck section in accordance with another embodiment.

In certain embodiments, as best shown in FIG. 18, the first edge portion 502 of the gap covering deck section 500 may include a wear resistant material 520. As shown in FIG. 18, the gap covering deck section 500 defines an opening 515 extending between the bottom inner surface 510*b* and a top surface 510*a*, with the wear resistant material 520 also being molded into the opening 515 and extending outwardly from the opening 515 along the bottom inner surface 510*b* to the first edge portion 502 to define a bottom wear resistant portion 518. In still further embodiments, the wear resistant material 520 includes a securing ledge portion 530 that extends along the top surface 510*a* of the top panel portion 510 outwardly from the opening 515 to aid in securing the wear resistant material 520 to the gap covering deck section 500 on both the bottom inner surface 510*b* and top surface 510*a* and through the opening 515. In some embodiments, the securing ledge portion 530 may be formed via a heat-staking process. Still further, the bottom wear resistant portion 518 extends beyond the first edge portion 502 to define a tip contacting portion 540. The tip contacting portion 535 of the wear resistant material 520 is thus considered an extension of the first edge portion 502 of the gap covering deck section 500.

Representative wear resistant materials 520 are the same wear resistant materials 220 described above and include, but are not limited to, nylon or Delrin® (an acetal homopolymer commercially available from DowDuPont of Midland, Michigan and Wilmington, Delaware). As best shown in FIG. 18, the gap covering deck section 500 is preferably configured such that tip contacting portion 535 is slidingly engaged to the top surface 49*a*, and remains slidingly engaged to the top surface 49*a*, of the first one of the adjacent pair of deck sections 40, 44 as the first one the first one of the adjacent pair of deck sections 40, 44 moves from the initial configuration to the raised configuration, as shown below in FIGS. 16 and 17.

Referring back to FIGS. 14 and 15, the second edge portion 504 of the gap covering deck section 500 also includes a coupling flange 540 that extends normal to and away from a plane defined by the flat top panel portion 510 (shown as generally downward relative to the top panel portion 510 in FIGS. 14 and 15). The coupling flange 540 includes a base portion 542 extending in a direction along the width between the spaced apart side edge portions 506, 508 that terminates into a first end flange portion 546, which extends along a portion of the length of the side edge portion 506, at one end and an opposing second end flange portion 548, which extends along a portion of the length of the side edge portion 508.

The first and second end flange portions 546, 548 are positioned adjacent to a corresponding pair of inner bracket portions 616, 618 which are respectively secured to the first edge portion 41 of the second one of the deck sections 40 (shown in FIGS. 14 and 15 as the leg deck section 48). A fixing device 615 is inserted through openings in the first and second end flange portions 546, 548 and through axially aligned openings in the bracket portions 616, 618 to secure the gap covering deck section 500 to each of the inner bracket portions 616, 618. In some embodiments, the fixing device 615 is in the form of a pin or a bolt. In the embodiment as best shown in FIGS. 14 and 15, the first and second end flange portions 546, 548 are located inwardly relative to a corresponding pair of inner bracket portions 616, 618. However, the first and second end flange portions 516, 518 could be positioned adjacent to and outwardly relative to a corresponding pair of inner bracket portions 616, 618 in some embodiments (not shown). Other configurations are contemplated.

As also shown in FIGS. 14-18, in certain embodiments, the first edge portion 41 of the second one of the deck sections 40 also includes a second pair of outer bracket portions 626, 628 that are coupled to and extend from the spaced apart side edge portions 45, 47. A fixing device 635 is inserted through openings in the respective second pair of outer bracket portions 626, 628 and through axially aligned openings in the brackets 111, 113 to pivotally coupled the second one of the adjacent pair of deck sections 40 to each of the brackets 111, 113. In some embodiments, the fixing device 635 is in the form of a pin or a bolt, which defines an axis such that the second one of the adjacent pair of deck sections 40 is pivotable or otherwise rotatable about the axis.

In some embodiments, the lengths of the pins 615 and 635 are axially aligned with one another. Accordingly, in embodiments wherein one, or both, of the first one and the second one of the adjacent pairs of deck sections 40 can move from an initial to a raised configuration, the gap covering deck portion 500 and the second one of the adjacent pair of deck sections 40 can pivot about the same rotational axis defined by the length of the pins 615, 635. In particular, the gap covering deck portion 500 will rotate about the aligned pivot axis in a rotational direction towards the stationary second one of the adjacent deck sections 40 (in either the raised or initial configuration) as the first one of the adjacent deck sections 40 moves from the initial configuration to the raised configuration, and will rotate about the aligned pivot axis in a rotational direction away from the stationary second one of the adjacent deck sections 40 as the first one of the adjacent deck sections 40 moves back to the initial configuration from the raised configuration. Similarly, the second one of the adjacent pair of deck sections 40 will rotate along the aligned pivot axis towards the stationary first one of the adjacent deck sections 40 (in either the raised or initial configuration), and will rotate about the aligned pivot axis in a rotational direction away from the stationary first one of the adjacent deck sections 40 as the second one of the adjacent deck sections 40 moves back to the initial configuration from the raised configuration.

Moreover, when the first one of the adjacent pair of deck sections 40 is moved from the initial configuration (see FIG.

Figure 17:
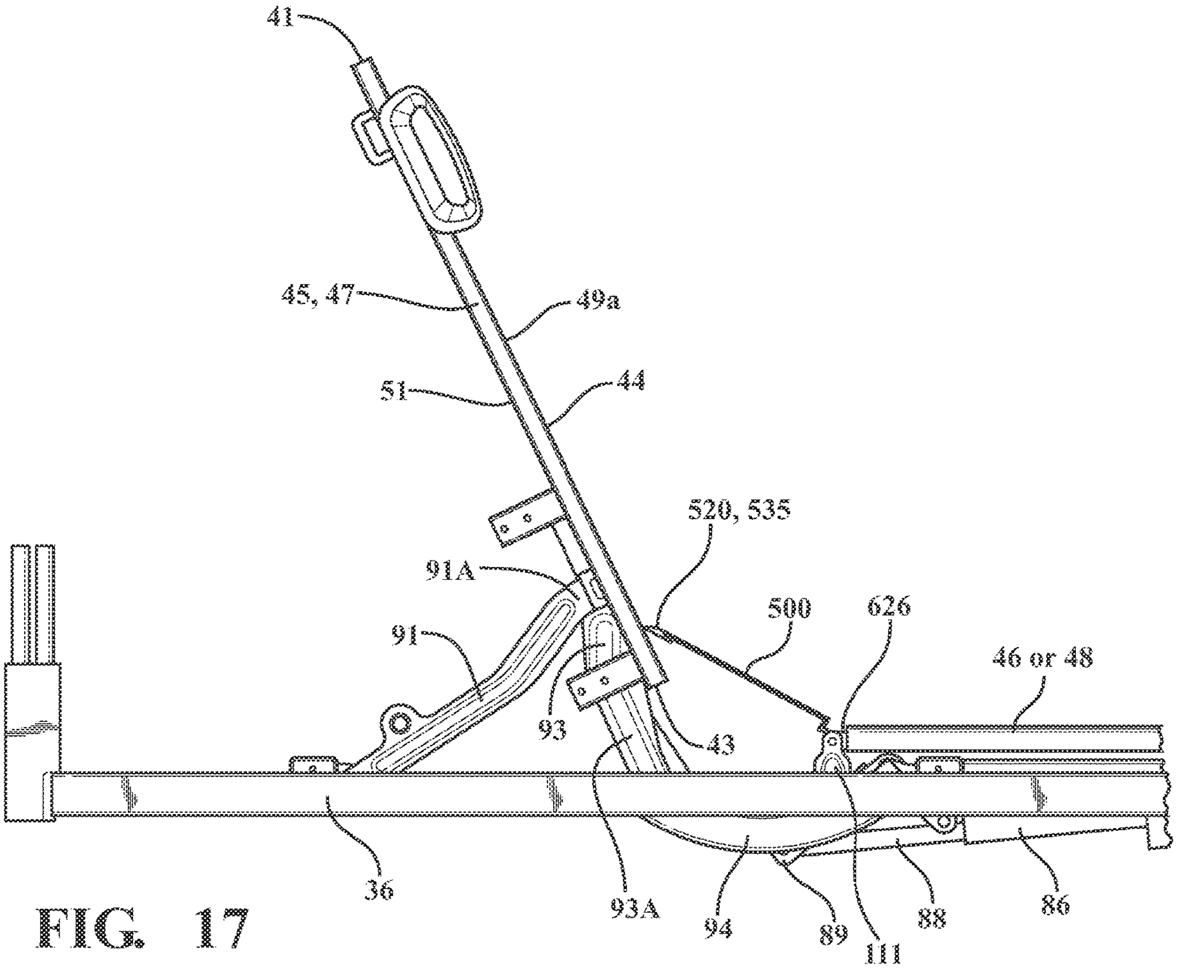
FIG. 17 is a side view of FIG. 16 with the fowler deck section in a raised configuration and the adjacent second deck section in the initial configuration.

16) to the raised configuration (see FIG. 17), via the movement along the arcuate path as described above with respect to the similarly moveable embodiments of FIGS. 1-6, the first edge portion 502 of the gap covering deck section 500 slides along the top surface 49*a* of the first one of the adjacent pair of deck sections 40 towards the second edge portion 43 and away from the first edge portion 41. As such, a portion of the gap covering deck section 500 is disposed above the gap 599 relative to the support frame 36 when the first one of the adjacent pair of deck sections 40 is in the raised configuration, as shown in FIG. 17.

Further, when the first one of the adjacent pair of deck sections 40 is returned to the initial configuration from the raised configuration, thereby eliminating the gap 599 as described above, the first edge portion 502 of the gap covering deck section 500 slides along the top surface 49*a* of the first one of the adjacent pair of deck sections 40 away from the second edge portion 43 and towards the first edge portion 41 to its original position. In the initial configuration, a greater portion of the gap covering deck section 500 is disposed adjacent to the top surface 49*a* of the underlying first one of the adjacent pair of deck sections 40 than in the raised configuration.

An even further aspect of this embodiment is realized where the first one of the adjacent pair of deck sections 40 is in the raised position and where the second one of the adjacent pair of deck sections 40 is also pivoted such that its second end portion 43 is spaced further away from the support frame 36 to the raised configuration. Notably, because the second one of the adjacent pair of deck sections 40 is only pivoted and does not move longitudinally away from the first one of the adjacent pair of deck sections 40 along an arcuate path, the size of the gap 599 is not increased.

The inclusion of a gap covering deck section 500, in any of the embodiments described herein, provides a solution for preventing the displacement of the mattress 39 into the gap created by the pivotal and translational movement of the first one of the adjacent pair of deck sections 40 relative to the second one of the adjacent pair of deck sections 40. Further, the gap covering deck section 500 also prevents the associated movement of a patient positioned on the mattress 39 of the patient support deck 38 from shifting downward within the gap 599.

As noted above, in certain embodiments including the seat deck section 46 as the second one of the adjacent pair of deck sections 40, the seat deck section 46 may be stationary (i.e., cannot move from an initial configuration to a raised configuration). In these embodiments, the seat deck section 46 may be secured directly to the support frame 36 in any manner, such as by welding or through the use of fastening members. In these embodiments, the seat deck section 46 may include the inner bracket portions 616, 618 such that it may be pivotally secured to the gap covering deck section 500 but are not required to include the outer bracket portions 626, 628.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus comprising:
a support frame;
a mattress;
a patient support deck operatively attached to the support frame defining a support surface adapted to contact the mattress, the patient support deck including a fowler deck section arranged for movement between an initial configuration and a raised configuration relative to the support frame, wherein a gap is defined between the fowler deck section and an adjacent deck section of the patient support deck when the fowler deck section is in the raised configuration; and
a gap covering deck section configured to articulate relative to the support frame and slidingly engage a top surface of the fowler deck section, the top surface defining at least a portion of the support surface and the gap covering deck section configured to slide along the top surface of the fowler deck section in response to the movement of the fowler deck section between the initial configuration and the raised configuration, the gap covering deck section being configured to be at least partially disposed over the gap when the fowler deck section is in the raised configuration.

2. The patient support apparatus of claim 1, comprising a wear-resistant material coupled to the gap covering deck section, the wear-resistant material configured to slidingly engage the top surface of the fowler deck section and configured to slide along the top surface as the fowler deck section is moved between the initial configuration and the raised configuration.

3. The patient support apparatus of claim 2, wherein the wear-resistant material includes a tip contacting portion coupled to a first edge portion of the gap covering deck section and a bottom wear resistant portion coupled to the tip contacting portion and extending along a bottom inner surface of the gap covering deck section and within an opening extending between a bottom surface and a top surface of the gap covering deck section.

4. The patient support apparatus of claim 3, wherein the wear-resistant material further includes a securing ledge portion extending from the opening along the top surface of the gap covering deck section away from the opening.

5. The patient support apparatus of claim 1, wherein the gap covering deck section includes a pair of side flanges positioned outwardly of, and adjacent to, a pair of spaced apart side edge portions of the fowler deck section during movement of the fowler deck section between the initial configuration and the raised configuration.

6. The patient support apparatus of claim 1, wherein the support frame includes a pair of spaced apart brackets; and
wherein the gap covering deck section is pivotably coupled to each of the pair of spaced apart brackets.

7. The patient support apparatus of claim 6, wherein the adjacent deck section of the patient support deck comprises a leg deck section.

8. The patient support apparatus of claim 7, wherein the leg deck section is pivotably coupled to each of the pair of spaced apart brackets.

9. The patient support apparatus of claim 6, wherein the adjacent deck section of the patient support deck comprises a seat deck section that is stationary relative to the support frame.

10. The Patient support apparatus of claim 1, wherein the fowler deck section has side edge portions and the gap covering deck section extends at least between the side edge portions.

11. The patient support apparatus of claim 10, wherein the gap covering deck section comprises a generally flat top panel portion defined by a first edge portion, an opposing second edge portion, and a pair of spaced apart side edge portions that each separately connect the first edge portion to the second edge portion; and
wherein a width of the gap covering deck section defined between the pair of spaced apart side edge portions is less than a width of the fowler deck section defined between the pair of side edge portions.

12. The patient support apparatus of claim 11, wherein the support frame includes a pair of spaced apart brackets;
wherein the gap covering deck section is pivotably coupled to each of the pair of spaced apart brackets adjacent to the second edge portion of the gap covering deck section.

13. The patient support apparatus of claim 12, wherein the support frame includes a pair of spaced apart brackets; and
wherein the adjacent deck section is pivotally coupled to each of the pair of spaced apart brackets.

14. The patient support apparatus of claim 13, wherein a pivoting axis of the gap covering deck section is axially aligned with a corresponding pivoting axis of the adjacent deck section.

15. The patient support apparatus of claim 12, wherein the gap covering deck section includes a coupling flange having a pair of spaced apart flange portions extending from a base portion, with each of the pair of spaced apart flange portions extending parallel to the pair of spaced apart side edge portions.

16. The patient support apparatus of claim 15, wherein the adjacent deck section includes a pair of spaced apart inner bracket portions, with one of the pair of spaced apart inner bracket portions pivotally coupled to a corresponding one of the pair of spaced apart flange portions and with the other one of the pair of spaced apart inner bracket portions pivotally coupled to a corresponding other one of the pair of spaced apart flange portions.

17. The patient support apparatus of claim 16, wherein the adjacent deck section includes a pair of spaced apart outer bracket portions, with one of the pair of spaced apart outer bracket portions pivotally coupled to a corresponding one of the pair of spaced apart flange portions and with the other one of the pair of spaced apart inner bracket portions pivotally coupled to a corresponding other one of the pair of spaced apart flange portions.

* * * * *